(12) United States Patent
Kruse

(10) Patent No.: US 7,080,962 B1
(45) Date of Patent: Jul. 25, 2006

(54) AIR CONVEYANCE APPARATUS

(75) Inventor: Mark William Kruse, Knoxville, TN (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/141,448

(22) Filed: May 31, 2005

(51) Int. Cl.
B65G 53/04 (2006.01)

(52) U.S. Cl. .............................. 406/93; 406/3; 406/88; 406/181; 209/644

(58) Field of Classification Search .................. 406/3, 406/88, 93, 94, 95, 181; 198/438, 370.11; 209/644, 932; 414/676; 271/195
See application file for complete search history.

(56) References Cited

U.S. PATENT DOCUMENTS

| | | | |
|---|---|---|---|
| 2,669,340 A | 2/1954 | Sjostrom | |
| 3,131,974 A | 5/1964 | Futer | |
| 3,180,688 A | 4/1965 | Futer | |
| 3,386,574 A | 6/1968 | Kaplan | |
| 3,469,887 A | 9/1969 | Nakahara et al. | |
| 3,588,088 A | 6/1971 | Reiners | |
| 3,822,777 A | 7/1974 | Jepsen | |
| 3,873,163 A | 3/1975 | Gladish | |
| 3,890,011 A | 6/1975 | Futer | |
| 3,980,180 A * | 9/1976 | Jamieson | 209/565 |
| 3,999,806 A | 12/1976 | Hurd | |
| 4,035,983 A | 7/1977 | Shanklin et al. | |
| 4,049,321 A * | 9/1977 | Bunting | 406/27 |
| 4,191,499 A | 3/1980 | Futer | |
| 4,214,663 A | 7/1980 | Schopp et al. | |
| 4,354,796 A | 10/1982 | Bergman | |
| 4,369,873 A | 1/1983 | Heuft | |
| 4,378,182 A | 3/1983 | Futer | |
| 4,405,126 A | 9/1983 | Frye et al. | |
| 4,527,346 A | 7/1985 | Schwartzott | |
| 4,572,497 A * | 2/1986 | Dreschel et al. | 270/58.01 |
| 4,708,564 A | 11/1987 | Mylrea et al. | |
| 4,773,524 A | 9/1988 | Greeves | |
| 4,842,125 A | 6/1989 | Besemann | |
| 5,037,245 A * | 8/1991 | Smith | 406/88 |
| 5,048,696 A * | 9/1991 | Evans | 209/552 |
| 5,051,058 A | 9/1991 | Roth | |
| 5,122,016 A * | 6/1992 | Lenhart | 406/86 |
| 5,147,153 A | 9/1992 | Aidlin et al. | |
| 5,423,410 A * | 6/1995 | Keller et al. | 198/406 |
| 5,441,252 A | 8/1995 | Hommes | |
| 5,475,917 A | 12/1995 | Biagiotti | |
| 5,603,199 A | 2/1997 | Hammacher | |
| 5,996,316 A | 12/1999 | Kirschner | |
| 6,010,128 A | 1/2000 | Loser et al. | |
| 6,145,650 A * | 11/2000 | Christ et al. | 198/493 |
| 6,152,289 A | 11/2000 | Wark et al. | |
| 6,398,461 B1 | 6/2002 | Vincent et al. | |

(Continued)

FOREIGN PATENT DOCUMENTS

CA 1289099 9/1991

(Continued)

*Primary Examiner*—Joe Dillon, Jr.
(74) *Attorney, Agent, or Firm*—Nathan P. Hendon

(57) ABSTRACT

An apparatus for conveying articles from one or more input streams to at least two output streams using air to support, convey and divert the articles is disclosed. The apparatus uses a plurality of primary air passageways to support and convey the articles and a plurality of secondary air passageways to divert and convey the articles. Also disclosed is a method for conveying articles from on or more input streams into at least two output streams utilizing the diverting apparatus.

23 Claims, 10 Drawing Sheets

U.S. PATENT DOCUMENTS 6,609,610 B1   8/2003   Guidetti

FOREIGN PATENT DOCUMENTS

| | | |
|---|---|---|
| CH | 561629 | 5/1975 |
| CH | 649258 | 5/1985 |
| EP | 0198518 A2 | 10/1986 |
| EP | 0761545 A2 | 3/1997 |
| EP | 1002755 B1 | 4/2004 |
| GB | 1414971 | 11/1975 |
| GB | 2166117 | 4/1986 |
| JP | 05116732 | 5/1993 |
| WO | WO 93/19964 | 10/1993 |

* cited by examiner under the arrangement of the pattern.

AIR CONVEYANCE APPARATUS

BACKGROUND

In the production, packaging and distribution of articles, various conveyance systems are used to transport those articles from one location to another. Combinations of various conveyance modules are used to move the articles to a desired location, preferably without damage to the article being conveyed. The use of air as a method or an aid to conveyance is well known and common.

For example, in the case of conveyance of stacks of newspapers, air conveyance tables are used where a change of direction is required and to bridge the gaps between conveyors. Often such tables are used to support the item while the direction of travel of the item is changed by some mechanical means. Such an air support allows for the change of direction without damaging the bottom surface of the traveling item. Examples of such devices can be found in U.S. Pat. No. 3,469,887 and European Patent Office Publication EP 0761545.

In known methods, change in lanes of travel or change in direction usually requires the use of impinging air on the side of the article or a pneumatic or mechanical means to push the article from one direction into another direction or position. Such means can damage the item and introduces more moving parts to a conveyance system. Additional moving parts means there are more things that require maintenance or that can malfunction.

In systems where articles are produced at a rate faster than they can be handled by subsequent processes (e.g., subsequent packaging or manufacturing systems), the stream of articles is often split between multiple subsequent process streams. For example, where multiple, end-packaging machines are used, an article stream may be regularly alternated between each of the packaging streams. Such a process provides alternating periods where a glut of articles is provided to a particular packaging machine (i.e., articles are provided at a rate greater than the packaging machine can handle) followed by a starvation period when no articles are provided to that packaging machine. In the periods of glut, the packaging machine works at its peak rate while articles wait in a queue to be packaged. In the periods of starvation, the machine sits idle as it awaits its next glut of articles. During the starvation period of one machine, another machine is normally in a glut period.

While a system using multiple sets of machines can handle more articles in a single period than a single machine could handle on its own, there are problems with such a system. First, by cycling between periods of starvation and glut, the machines are forced to operate in a cycle alternating between maximum output and sitting idle. This is not the optimum operating condition for any machine; constant starting and stopping of the machine will cause undue wear on the machine and result in a shorter time between repairs and increased repair downtime. The most efficient use of such a multiple machine system is achieved with a regular, continuous supply of articles to all machines.

Secondly, such a system requires a means for diverting flow of articles between the multiple machines. One such prior art set-up is shown in FIG. 1. In the system of FIG. 1, articles 12 produced by the manufacturing equipment are conveyed on an input conveyor 11 to the diverting equipment 14. The diverting equipment 14 comprises a set of mechanical arms between which the articles 12 pass to either of two conveyors 17,19, depending upon the arrangement of the diverting equipment 14. When it is desired to switch from one conveyor to the other conveyor, the mechanical arms close upon the articles 12 passing between the arms, thus trapping the articles 12 between the arms. Simultaneously, the set of mechanical arms pivots with the trapped articles over to the second conveyor 19. When positioned over the second conveyor 19, the mechanical arms spread and release the articles 12 that have accumulated within the closed mechanical arms.

A problem with such a set up is that articles accumulate behind the articles trapped within the mechanical arms until the mechanical arms release the articles. If the arms cycle slower than the manufacturing equipment is producing the articles, there is a danger that the articles could accumulate back into, and jam, the manufacturing equipment. Another problem is that articles can become jammed within the arms of the diverting equipment 14 if the articles are not properly detected and/or the actuation of the arms is not properly timed. Additionally, such mechanical arms have the disadvantage of pinching the items that are caught at the outlet of the mechanical arms. Such pinching can damage the article and such damaged articles may cause problems in subsequent packaging processes. Finally, there will be a gap in articles being sent to any of the multiple, subsequent processes while the article flow is being switched from one conveyor to another. As discussed above, this will result in less than optimal machine-use.

In view of the issues above, it is desired to have a means of conveyance capable of separating one or more article streams into two or more output streams without the impacting or pinching the side of the articles within the article stream. It is further desired that system require a minimum of energy to move the articles within the article stream.

SUMMARY OF THE INVENTION

The present invention is directed to an apparatus for conveying articles from one or more input streams to at least two output streams. The apparatus is made up of an air chamber connected to a primary air source, a top plate attached to the top of the air chamber, and an intermittent air supply connected to the top plate. The top plate has an upper surface with a first conveyance zone, a second conveyance zone adjacent to the first conveyance zone, and a first diversion zone over which articles are selectively propelled from the first conveyance zone to the second conveyance zone. The first conveyance zone has a plurality of primary air passageways arranged such that the articles are supported and propelled through the first conveyance zone in a conveyance direction by air from the air chamber passing through the primary air passageways. The second conveyance zone has a plurality of primary air passageways arranged such that the articles are supported and propelled through the second conveyance zone in the conveyance direction by air passing from the air chamber through such primary air passageways. Finally, the first diversion zone has a plurality of secondary air passageways arranged to selectively divert articles from the first conveyance zone to the second conveyance zone by air supplied by the intermittent air supply to the upper surface through the secondary air passageways.

In embodiments of the invention, the plurality of primary air passageways may extend from the bottom surface to the upper surface and intersect the upper surface at an angle to the upper surface of ninety degrees or less. In other embodiments, the primary air passageways may intersect the upper surface at an angle to the upper surface between about fifteen and seventy-five degrees, at an angle between about thirty and sixty degrees, at an angle of about forty-five degrees or less, or at an angle of about thirty degrees or less. In various embodiments the primary air passageways may be substantially linear, non-linear, have a greater area near the upper surface than near the bottom surface of the top plate, or may have a nozzle near the upper surface of the top plate.

In other embodiments of the invention, the plurality of secondary air passageways may extend from air shafts, drilled into the top plate from the edges of the top plate, to the upper surface and intersect the upper surface at an angle to the upper surface of ninety degrees or less. In other embodiments, the secondary air passageways may intersect the upper surface at an angle to the upper surface of about seventy-five degrees or less, at an angle of about sixty degrees or less, at an angle of about forty-five degrees or less, or at an angle of about thirty degrees or less. In various embodiments the secondary air passageways may be substantially linear, non-linear, have a greater area near the upper surface than near the bottom surface of the top plate, or may have a nozzle near the upper surface of the top plate.

Some embodiments of the present invention include a sensor that detects articles entering the input side of the apparatus and a processor linked to the sensor that determines whether the article is to be diverted to the second conveyance zone and sends the appropriate signal to the intermittent air supply. In further embodiments, the intermittent air supply may be a secondary air supply intermittently controlled by one or more solenoid valves. Those solenoid valves may be split into multiple banks of solenoid valves and controlled to deliver intermittent air to the secondary air passageways sequentially to divert the article as it progresses along the apparatus in the conveyance direction.

Additional diversion zones and additional conveyance zones are contemplated in further embodiments of the invention.

The invention is also directed to a conveyance assembly for conveying articles having at least one input conveyor, at least two output conveyors, and a diverting apparatus between the input and output conveyers. The diverting apparatus has an upper surface that supports, conveys and selectively diverts articles from the input conveyor to the desired output conveyors with air that is supplied through the upper surface. The air may be supplied to the upper surface through a plurality of primary air passageways and a plurality of secondary air passageways, adapted to support, convey and selectively divert the articles over the upper surface of the diverting apparatus as desired. The air supplied to divert articles may be supplied through the upper surface by an intermittent air supply. Additionally, a slide plate may be used between the diverting apparatus and the output conveyors and may be adapted to allow transfer of articles from the diverting apparatus to the output conveyors.

Finally, the invention is directed to a method of conveying articles from one or more input streams into at least two output streams. The method includes the step of providing a diverting apparatus having an input side, an output side, and a top plate having an upper surface that articles pass over in a conveyance direction and through which air is provided to the upper surface and impinges on the bottom surfaces of the conveyed articles. The method continues with the steps of conveying articles to the input side of the diverting apparatus; detecting articles entering the input side of the diverting apparatus; supporting and conveying the articles through a first conveyance zone of the diverting apparatus in the conveyance direction with air provided through the top plate to the upper surface of the diverting apparatus; determining whether or not to divert the detected article; diverting the article, if desired, to a second conveyance zone of the diverting apparatus with intermittent air provided through the top plate to the upper surface, and then supporting and conveying the article through the second conveyance zone in the conveyance direction with air supplied through the top plate to the upper surface; and conveying articles from the output side of the diverting apparatus.

DETAILED DESCRIPTION

As discussed above, there is a desire that one or more streams of articles be diverted into two or more streams to ensure greater efficiency and speed of subsequent packaging or manufacturing equipment. The articles that are contemplated for conveyance are any articles that are normally conveyed by such systems. These may include, but are not limited to, tissues, towels, other paper products, wipers, newspapers, and absorbent personal care products such as diapers, feminine care products, incontinence products, and the like. These articles may be conveyed to subsequent packaging or manufacturing equipments as individual articles or as a stack or bundle of articles. In particular, this invention uses air to support, convey and divert the articles. To successfully convey and divert the articles 12 with air, the surface of the articles 12 facing the conveying and diverting air should be relatively flat, concave or any other type of surface that can be regularly supported and conveyed by a cushion of air.

Figure 1:
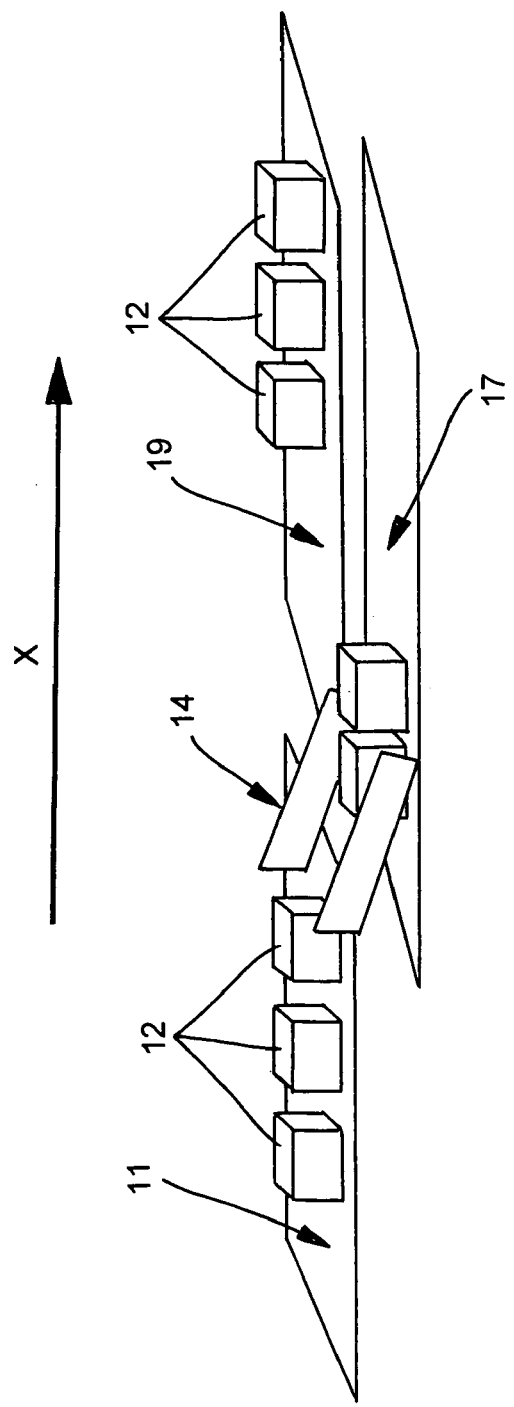
FIG. 1 is a schematic, perspective view of a prior art mechanical diverting device used to divert a stream of articles from one conveyor to a second conveyor.
Figure 2:
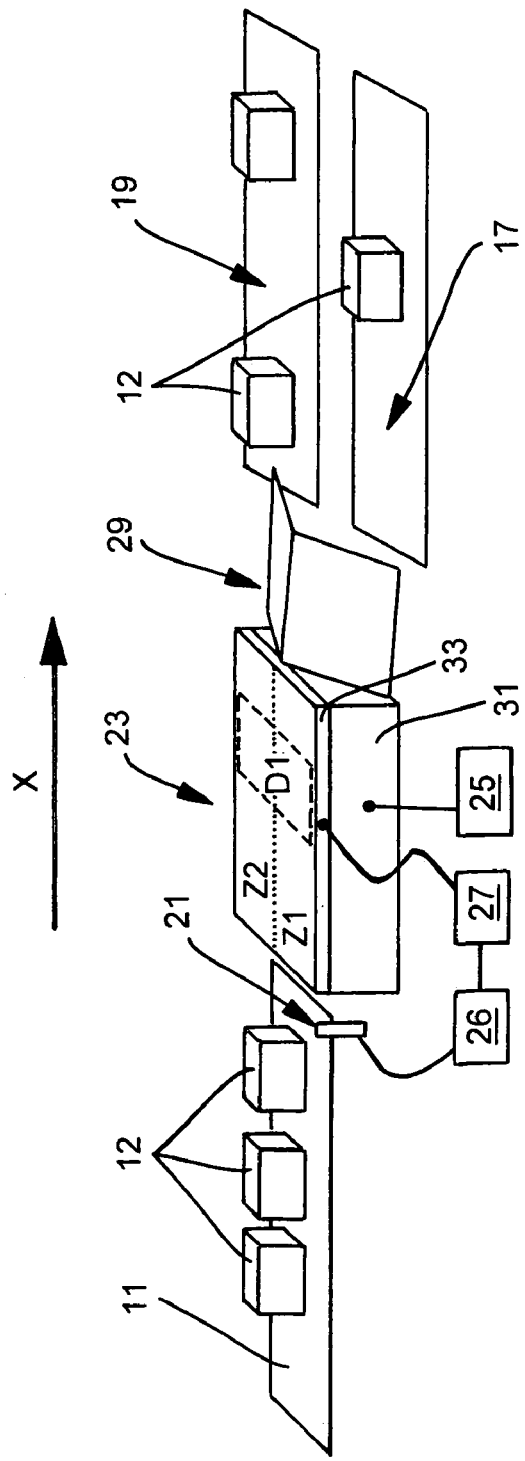
FIG. 2 is a schematic, perspective view of an article conveyance system using an embodiment of the diverting apparatus of the present invention.

FIG. 2 is a schematic of such a conveyance system. In general, articles 12 in an article stream are conveyed along the conveyance direction X toward a diverting apparatus 23 by an input conveyor 11. The articles 12 are then diverted to one of two output conveyors by the diverting apparatus 23.

Subsequently, the articles 12 are taken away on either the first output conveyor 17 or the second output conveyor 19.

The articles enter the input side of the diverting apparatus 23 and generally will travel across the diverting apparatus 23 through its first conveyance zone, which is indicated as the area marked Z1 in FIG. 2. As it travels along the first conveyance zone Z1, in the conveyance direction X, air is supplied from the top surface of the diverting apparatus 23 to both support and convey the article 12 toward the first output conveyor 17.

Alternatively, if it is desired that the article 12 is to be taken away by the second output conveyor 19, the article 12 is diverted from the first conveyance zone Z1 to the adjacent second conveyance zone Z2 by an intermittent supply of air that impinges on the article 12 in the first diversion zone D1. As seen in FIG. 2, the first diversion zone D1 overlaps both the first conveyance zone Z1 and the second conveyance zone Z2. The diverting air of the first diversion zone D1, like the air provided for support and conveyance in the conveyance zones, is also provided from the top surface of the diverting apparatus 23. Once diverted, the article 12 travels through the second conveyance zone Z2 toward the second output conveyor 19, in the conveyance direction X. The article 12 is supported and conveyed by air supplied from the top surface of the diverting apparatus 23.

The diverting apparatus 23 selectively diverts articles by first detecting articles entering the input side of the diverting apparatus 23 by use of a sensor 21. The sensor 21 communicates with a processor 26, which decides whether or not the article 12 should be taken away from the diverting apparatus 23 by the first output conveyor 17 or if it should be diverted to the second output conveyor 19. The sensor 21 may be any type of sensor that is adapted to detect the type of article 12 that is being conveyed. Examples of such sensors may include, but are not limited to, optical sensors, photo eyes, cameras, mechanical reed switches, or other such sensors as known in the art. One exemplary sensor is the MINI-BEAM® SM2A312 Series Photoelectric Sensor available from Banner Engineering Corp., Minneapolis, Minn.

In one embodiment of the invention, the sensor 21 that detects the articles may also identify whether or not the article is defective. The sensor itself may detect the defect or may detect an article that has been identified as defective by a separate defect detection system. In either case, the defective article can be diverted to the appropriate output conveyor for disposal or may be diverted off of the diverting apparatus 23 to a cull chute or similar system used to collect defective articles.

The processor 26 needs to be able to receive the data from the sensor 21, make a decision whether to divert the article 12 and send a signal to the intermittent air supply 27. Examples of such processors may include, but are not limited to, a programmable logic controller (PLC), a computer, a mechanical trip system, a series of relays, or other such processors as known in the art. One exemplary processor is the Rockwell Automation Logix5555 Processor (Model 1756-L55 with 1756-m13 memory expansion submodule) available from Rockwell Automation, Milwaukee, Wis.

The intermittent air supply 27 receives the signal from the processor to divert the article 12 and responds by supplying air to the top surface of the diverting apparatus 23 in the first diversion zone D1. The air is supplied in the first diversion zone D1 in such a way as to push the article 12 from the first conveyance zone Z1 into the second conveyance zone Z2. The intermittent air supply 27 is generally an air source along with a system of valves that is capable of delivering air to the first diversion zone D1 when, and only when, it is desired. Typically, the intermittent air supply 27 will be a pressurized air supply that is attached to the top plate 33 of the diverting apparatus 23 by one or more valves. The valves may be any type of valve, such as a solenoid or rotary valve, for example, which can be controlled to only allow air to pass to the top plate 33 when desired. Typically, a solenoid valve is used. An exemplary solenoid valve is the ASCO® TopHat® Long Life solenoid valve (Model 8210G2Q) available from ASCO, Florham Park, N.J.

The valves control the flow of air from the pressurized air supply to the first diversion zone D1 of the top plate 33. The valves may be programmed to release the air simultaneously to the first diversion zone D1 or they may be programmed to release the air sequentially as the article 12 progresses downstream through the first diversion zone D1 in the conveyance direction X. Individual valves could also be programmed to open and close sequentially as the article 12 proceeds along the diverting apparatus 23 in the conveyance direction X.

On the output side of the diverting apparatus 23, a slide plate 29 may be used to ensure that the articles 12 make it on to either the first output conveyor 17 or the second output conveyor 19. As shown in FIG. 2, the slide plate 29 is sloped down toward both of the output conveyors which are at a lower elevation than the top surface of the diverting apparatus 23. An article 12 that travels along the first conveyance zone Z1 will proceed off of the diverting apparatus 23 and slide down the slide plate 29 to the first output conveyor 17. An article 12 that is diverted to the second conveyance zone Z2 will proceed off of the diverting apparatus 23 and slide down the slide plate 29 to the second output conveyor 19.

Typically, such a slide plate 29 may be required when the diverting apparatus 23 is unable to fully divert the article 12 and convey the article 12 along the second conveyance zone Z2 before the article 12 reaches the output side of the diverting apparatus 23. In such a case, the article 12 will be heading in the direction of the second output conveyor 19 when it reaches the output side of the diverting apparatus 23; the slope of the slide plate 29 will help the article 12 fall toward the second output conveyor 19.

It may be desired to control the articles 12 from freely tumbling or rolling down the slide plate 29. The articles 12 being conveyed to subsequent manufacturing or packaging equipment are easier to handle when they are controlled to a uniform configuration rather than a random configuration of articles 12 (i.e., each with a different side facing up or with articles 12 tipped up on their ends). The air pressures used in the diverting apparatus 23 and the relative drop from the top surface of the diverting apparatus 23 to the output conveyors 17, 19 may be adjusted to minimize variations of article configurations presented to subsequent manufacturing or packaging equipment. Additionally, the shape, dimensions, and the slope of the slide plate 29 can also be designed to ensure control of articles 12 exiting the diverting apparatus 23 to the output conveyors 17, 19. The shape, slope and location of the slide plate 29 may also be adjustable such that the plate may be controllably adapted for modifications in article 12 dimensions or for changes in line speed of the overall conveyance system.

The slide plate 29 may be made of any material that is strong enough to support the articles 12 and that has a smooth surface to minimize the reduction of the articles' momentum in the conveyance direction. Typically, the slide plate 29 may be made of materials such as steel, stainless steel, aluminum, PVC, nylon, or similar materials. Likewise, the slide plate 29 may be a material that is coated with a smooth material (e.g. Teflon, polycarbonate, or the like) to yield a surface across which an article may easily slide.

Figure 3:
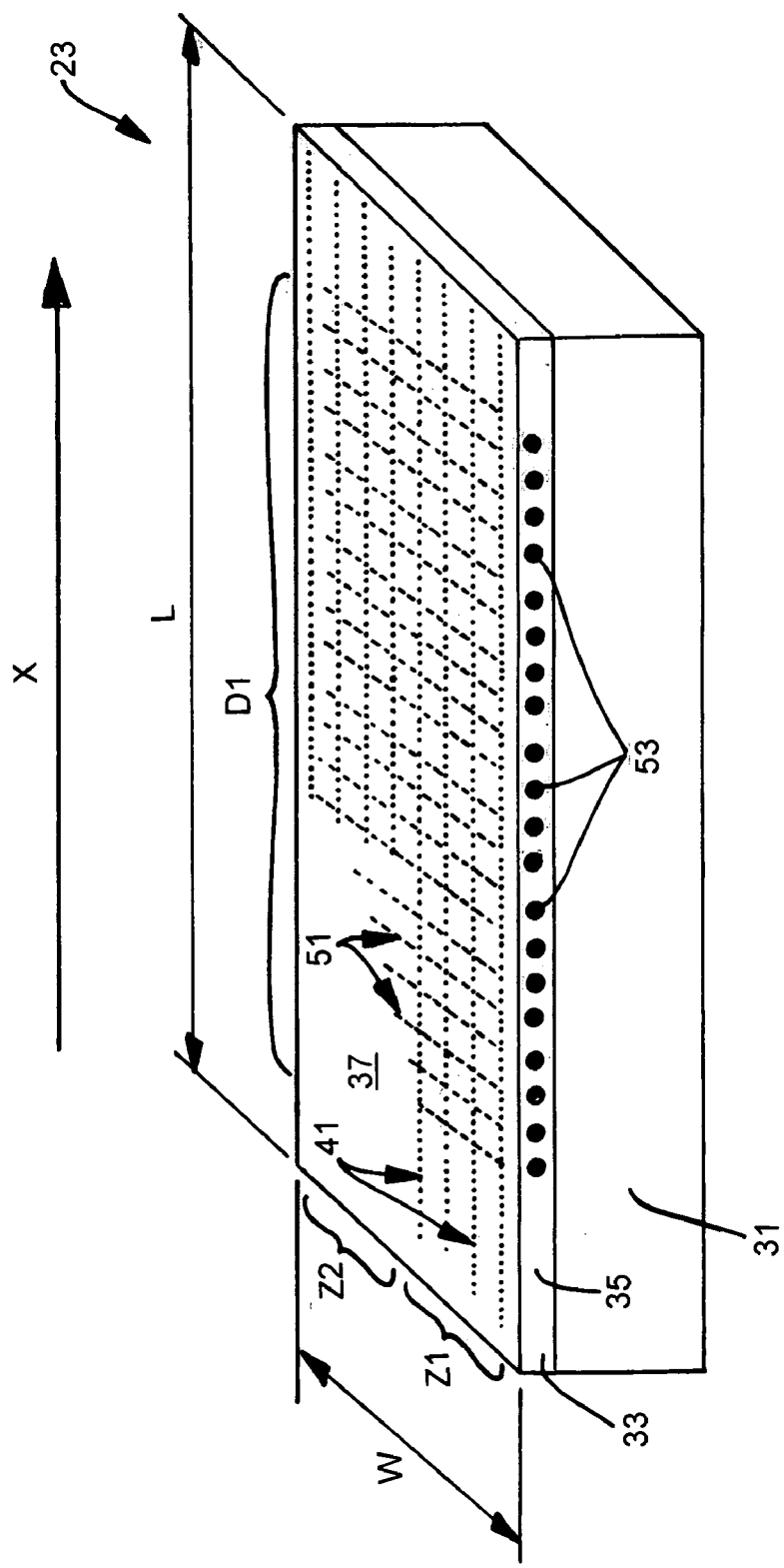
FIG. 3 is a perspective view of an embodiment of the diverting apparatus of the present invention.

The diverting apparatus 23 is generally composed of two major parts: the air chamber 31 and the top plate 33. The air chamber 31, as shown in FIGS. 2 and 3, is an enclosed, air-tight volume that holds and provides air to the top plate 33. As shown in FIGS. 2 and 3, the air chamber 31 is typically a rectangular box in shape, with the top plate 33 forming the top lid to the box. However, the air chamber 31 may be any shape that is required for the overall conveyance system. The air chamber 31 may be a box of symmetrical or asymmetrical design and shape. The air chamber 31 should have an upper edge that can mate with the bottom of the top plate 33 so as to form an air tight seal between the two. Alternatively, the air chamber 31 may not be a box at all; the air chamber 31 may instead be individual air supplies attached to the top plate 33 in which the air supplies can be controllably adjusted, either individually or collectively, to provide any desired pattern of air flow.

Air is supplied to the air chamber 31 from a primary air source 25. Typically, the primary air source 25 will be the main air system which supplies pressurized air to the particular machine and/or the entire facility. The supplied air works to pressurize the air chamber 31 to a pressure adequate to support the articles being conveyed across the diverting apparatus 23.

The air chamber 31 may be made of any suitable material that can support the top plate 33, maintain an air-tight seal with the top plate 33, and withstand the air pressures required of the particular diverting apparatus 32. Typically, a material such as steel, stainless steel, aluminum, PVC, plastics, or other relatively rigid materials would be adequate for construction of an air chamber 31.

The top plate 33 sits on top of the air chamber 31 as shown in FIG. 3. The top plate 33 is generally a unitary plate of material having a upper surface 37, a bottom surface 39, and a thickness that defines side surfaces 35 that extend from the bottom surface 39 to the upper surface 37 and define the periphery of the top plate 33 (see FIGS. 3, 4 and 5).

In FIG. 3, the top plate 33 is shown as rectangular in shape, but the top plate 33 may be any size and shape that will fit on top of the air chamber 31 and is appropriate for the needs of the particular conveyance system. The top plate 33 width W is dependent on the width of the articles 12 that are to be conveyed and the number of conveyance zones that are desired. The length L of the top plate 33 will depend on the ability of the diverting apparatus 23 to divert the articles. A longer diverting apparatus 23 will allow for greater ease of diverting an article 12 from one conveyance zone fully into a second conveyance zone. A shorter diverting apparatus 23 may require the use of a slide plate 29, as in FIG. 2, to deliver the article to the appropriate output conveyors as articles 12 may not have enough length to be fully diverted from a first conveyance zone into a second conveyance zone.

The top plate 33 may be made of any suitable material that can support the conveyed articles 12 and has a smooth surface so that the upper surface 37 does not unduly reduce the articles' momentum in the conveyance direction. The top plate 33 may be made of the same material as the air chamber 31 or it may be a different material than that of the air chamber 31. Typically, the top plate 33 may be made of materials such as steel, stainless steel, aluminum, PVC, nylon, plastics or similar materials.

Figure 4:
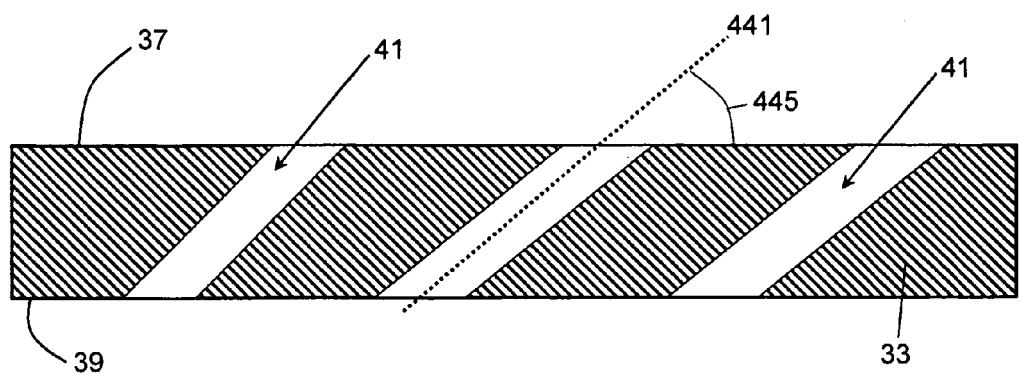
FIG. 4 is a cross-sectional view, of the top plate of the diverting apparatus of the present invention, as viewed from the side.

The cushion of air that is supplied to the upper surface 37 of the top plate 33 to support, convey and divert articles 12 is delivered through a plurality of air passageways that exit to the upper surface 37. The air passageways are present in two forms within the structure of the top plate 33: primary air passageways 41 and secondary passageways 51. As shown in FIG. 4, the primary air passageways 41 pass from the bottom surface 39 through the thickness of the top plate 33 and exit through the upper surface 37. Air can pass from the air chamber 31 through the top plate 33 to the upper surface 37 where it can support and convey articles 12 that pass over the exits of such primary air passageways 41. As long as air is supplied to the air chamber, the primary air passageways 41 provide that air to the upper surface 37 of the top plate 33.

The primary air passageways 41 are shown in FIG. 4 as substantially linear in shape. As used here "substantially linear" refers to primary air passageways 41 having only a single primary axis 441 through the center of the passageways; there are no bends, kinks, or curvature in the passageways. As shown in FIG. 4, the primary air passageways 41 are uniform in size (with regard to planes perpendicular through the primary axis 441) near the point where the primary air passageway 41 passes through the bottom surface 39 to near the point where it passes through the upper surface 37. However, the primary air passageways 41 may also be non-uniform having a variable area as the passageway progresses through the top plate 33, while still remaining substantially linear. For example, the diameter of the primary air passageway 41 may decrease from the bottom surface 39 to upper surface 37.

The primary air passageway 41 may be produced by drilling the passageway through the top plate 33 or by any method as is commonly understood in the art. Generally, the primary air passageways 41 are produced by using a machining drill bit to drill through the top plate 33, resulting in holes that are substantially cylindrical in shape. Other fabricating methods could be used to produce non-circular shapes. Examples of such alternative methods may include, but are limited to, stamping, punching, laser cutting, water jet cutting, fused deposition modeling and other such methods as are known in the art.

As shown in FIG. 4, the primary air passageways 41 intersect the upper surface 37 of the top plate 33 at an angle to the upper surface 37. This primary angle 445 is measured as the angle between the primary axis 441 and the upper surface 37 of the top plate 33. The primary angle 445 may be any angle from about zero degrees (i.e., flush with or parallel to the surface) to about ninety degrees (i.e., vertical or perpendicular to the surface). The smaller the angle (i.e., closer to zero degrees) the air provided by such a primary air passageway 41 will provide more impetus to an article 12 in the direction that the exit of the primary air passageway is pointed. The closer the primary angle 445 is to vertical, the air passing through such the primary air passageway 41 will provide more support to articles 12 that pass over those passageways. The primary air passageways 41 are utilized to both support articles 12 above the upper surface 37 and to help convey those articles 12. With that purpose in mind, the primary angle 445 is typically between about fifteen and seventy-five degrees. The primary angle 445 is preferably between about thirty and sixty degrees, with the exit of the primary air passageway 41 on the upper surface 37 pointing in the general direction of desired conveyance.

As is well known, the force that the air can exert on the articles 12 that pass over the diverting apparatus 23 is a function of the air pressure provided to the upper surface 37 and the area through which that air is delivered. The number and size of the primary air passageways 41 may be adapted to meet the needs of the articles that are conveyed. Additionally, the air pressure provided to the air chamber 31 may likewise be adjusted to meet conveyance system needs.

Figure 5:
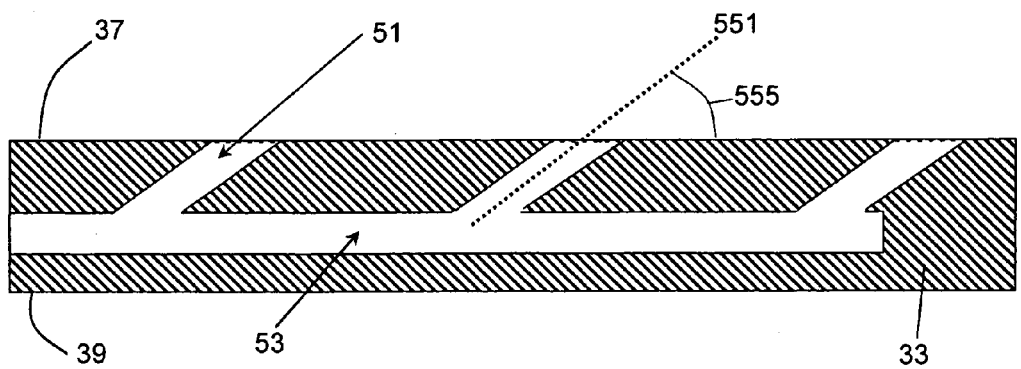
FIG. 5 is a cross-sectional view, of the top plate of the diverting apparatus of the present invention, as viewed from the end.
Figure 6:
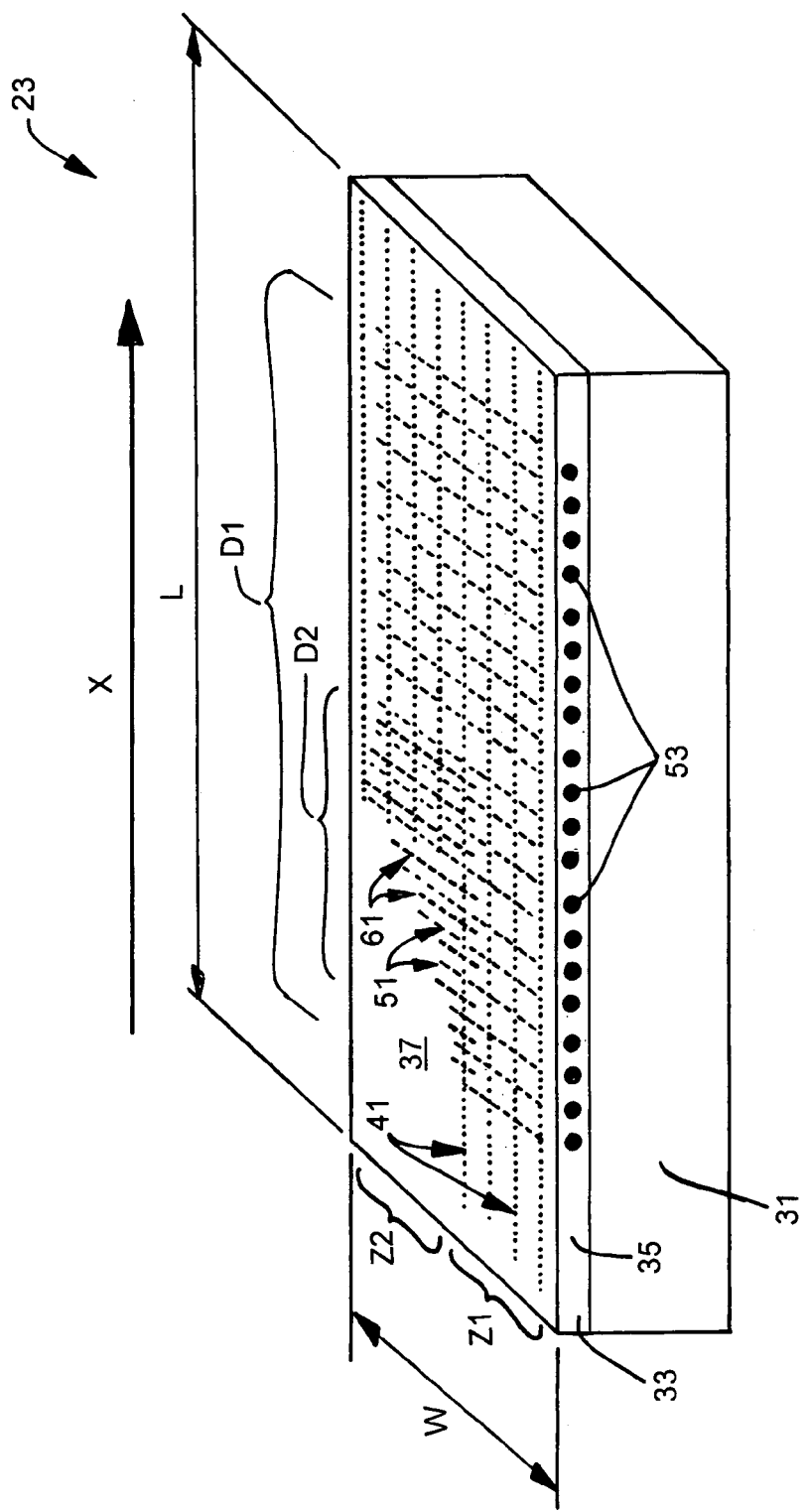
FIG. 6 is a perspective view of an embodiment of the diverting apparatus of the present invention.

In addition to the primary air passageways 41, secondary air passageways 51 are also present in the structure of the top plate 33. As shown in FIG. 5, the secondary air passageways 51 pass from an air shaft 53 through the thickness of the top plate 33 and exit through the upper surface 37. Air can pass from the air shaft 53 through the top plate 33 to the upper surface 37 where it can support, convey and divert articles 12 that pass over the exits of the secondary air passageways 51. The air shafts 53 are holes that are drilled into the top plate 33, generally parallel to the upper surface 37, from the edge surfaces 35 of the top plate 33. While the air shafts 53 are shown in FIGS. 3 and 6 as extending from the edge surface 35 closest to the viewer into the top plate 33, perpendicular to the conveyance direction X, other configurations are possible. The air shafts 53 could additionally, or alternatively, be drilled from the opposite side of the top plate 33 and/or from either of the ends of the top plate 33 and parallel to the conveyance direction X.

The air shafts 53 provide air from an intermittent air supply 27 to the secondary air passageways 51. In an exemplary configuration, the intermittent air may be a supply of air that is supplied to one or more solenoid valves. The intermittent air is then connected from the solenoid valves to the individual air shafts 53. A single solenoid valve could provide all of the air delivered to the air shafts 53, multiple solenoid valves could provide air to multiple air shafts 53, each air shaft 53 may receive air from individual solenoid valves, or any combination thereof.

The secondary air passageways 51 are shown in FIG. 5 as substantially linear in shape. As used here "substantially linear" refers to secondary air passageways 51 having only a single secondary axis 551 through the center of the passageways; there are no bends, kinks, or curvature in the passageways. As shown in FIG. 5, the secondary air passageways 51 are uniform in size (with regard to planes perpendicular through the secondary axis 551) near the point where the secondary air passageway 51 passes into the air shaft 53 to near the point where it passes through the upper surface 37. However, the secondary air passageways 51 may also be non-uniform having a variable area as the passageway progresses through the top plate 33, while still remaining substantially linear. For example, the diameter of the secondary air passageway 51 may decrease from the air shaft 53 to upper surface 37.

Like the primary air passageways 41, the secondary air passageways 51 and air shafts 53 may produced by drilling the passageway or shaft into the top plate 33 of by any method that is commonly understood in the art. Generally, the secondary air passageways 51 will be produced by drilling a hole through the top plate 33 to the air shaft 53 with a machining drill bit. Likewise, the air shafts 53 are also generally bored into the top plate 33 with a drill bit. A result of such drilling are holes that will be substantially cylindrical in shape. Other fabricating methods could be used to produce non-circular shapes. Examples of such alternative methods may include, but are limited to, stamping, punching, laser cutting, water jet cutting, fused deposition modeling and other such methods as are known in the art.

As shown in FIG. 5, the secondary air passageways 51 intersect the upper surface 37 of the top plate 33 at an angle to the surface. This secondary angle 555 is the angle between the secondary axis 551 and the upper surface 37 of the top plate 33. The secondary angle 555 may be any angle between about zero degrees (i.e., flush with or parallel to the surface) to about ninety degrees (i.e., vertical or perpendicular to the surface). The smaller the angle (i.e., closer to zero degrees) the air provided by such a secondary air passageway 51 will provide more impetus to an article 12 in the direction the exit of the secondary air passageway 51 is pointed. The closer the secondary angle 555 is to vertical, the air will provide more support to an article 12 that pass over such secondary air passageways 51.

The secondary air passageways 51 divert articles 12 from one conveyance zone to another conveyance zone with a blast of air from the intermittent air supply 27, as the articles progress along the conveyance direction X. With that purpose in mind, the secondary angle 555 is typically about seventy-five degrees or less, with the exit of the secondary air passageways 51 on the upper surface 37 pointing in the general direction in which it is desired to divert the articles 12. Preferably, the secondary angle 555 is about sixty degrees or less, with the exit of the secondary air passageways 51 on the upper surface 37 pointing in the general direction in which it is desired to divert the articles 12.

The locations of where the primary and secondary air passageways 41, 51 intersect the upper surface 37 are configured to supply air to the upper surface 37 as necessary to meet the needs of the particular diverting apparatus 23. As seen in FIG. 3 the primary air passageways 41 are arranged in substantially parallel rows that extend the length L of the top plate 33, parallel to the conveyance direction X. FIG. 3 shows eight rows of primary air passageways 41, although the actual number of rows may be greater or fewer than shown, depending on the type and size of articles 12 being conveyed. It is desired that there are enough primary air passageways 41 to support and convey the article 12. If there are too many holes passing from the air chamber 31 to the upper surface 37, it may require that more air be supplied to the air chamber 31 to supply the upper surface 37 with adequate air to support and convey the articles. Conversely, fewer holes will require less air be supplied to the air chamber 31 while still providing adequate air pressure to convey the articles.

The primary air passageways 41 that make up the parallel rows as shown in FIG. 3 are arranged into the first and second conveyance zones Z1, Z2 as previously discussed. As shown in FIG. 3, the first conveyance zone Z1 comprises the four parallel rows of primary air passageways 41 closest to the viewer; the second conveyance zone Z2 comprises the four parallel rows of primary air passageways 41 farthest from the viewer. As seen in FIG. 3, the rows of primary air passageways 41 that comprise the second conveyance zone Z2 do not extend the entire length L of the top plate 33. The rows of the second conveyance zone Z2 may be different lengths and may be longer or shorter than shown. As the articles 12 enter the diverting apparatus 23 in the first conveyance zone Z1 before being diverted to the second conveyance zone Z2, there is little need for primary air passageways 41 in an area of the second conveyance zone Z2 that will not be utilized to support or convey articles 12. To ensure efficient use of provided air pressure, it may be desired to remove the primary air passageways 41 in such areas.

Again the purpose of the conveyance zones is to support and convey articles in the conveyance direction X. Thus the primary air passageways 41 will be substantially pointed in the conveyance direction X; the primary axis 441 of each primary air passageways 41 will be pointed substantially in the conveyance direction X. Generally, the primary axis 441 will be parallel to the conveyance direction X, but they may also be at an angle to the conveyance direction X. For instance, the primary air passageways 41 may alternate from either side of parallel to the conveyance direction X as long as the primary air passageways 41 convey the articles 12 along the particular conveyance zone.

The primary air passageways 41 may also be present on the upper surface 37 for other specialized purposes to aid in conveyance. For example, the primary air passageways 41 may be present to slow down the momentum of an article that is passing over the diverting apparatus 23. In such a case, the primary axis 441 of such primary air passageways 41 may be pointed in a direction primarily opposite that of the conveyance direction X. In another example, the primary air passageways 41 may be present to aid in diverting an article or to convey the article in a second conveyance direction. In this case, the primary axis 441 of such primary air passageways 41 may be pointed in the direction it is desired to divert or convey the article, not necessarily in the conveyance direction X. Finally, the primary and secondary air passageways 41, 51 may be arranged to additionally allow for the conveyed article to be rotated while it conveyed on the diverting apparatus 23.

Additionally, the first conveyance zone Z1 is shown in FIG. 3 as parallel rows of primary air passageways 41. The primary air passageways 41 may also or may alternatively be any other pattern or a random pattern throughout the first conveyance zone Z1. The primary air passageways 41 of the first and second conveyance zones Z1, Z2 may be the same pattern or may be different from each other. Additionally, the pattern of the primary air passageways 41 in the first and second conveyance zones Z1, Z2 may be different along the length L of the top plate 33.

The first and second conveyances zones Z1, Z2 are shown in FIG. 3 as adjacent and parallel. The conveyance zones are adjacent at some point so the article 12 may pass from one conveyance zone to another conveyance zone. However, the conveyance zones may diverge as the article 12 proceeds in the conveyance direction X. This would be dependent on the shape and design of the diverting apparatus 23 and the overall needs of the conveyance system.

In the embodiment of FIG. 3, the diverting air is supplied to the upper surface 37 by secondary air passageways 51 that are arranged in a first diversion zone D1. As shown in FIG. 3, the first diversion zone D1 is made up of parallel columns of secondary air passageways 51 that overlap both the first and second conveyance zones Z1, Z2. However, the first diversion zone D1 may instead only overlap a portion of the first conveyance zone Z1 or may only overlap a portion of the second conveyance zone Z2. The first diversion zone D1 may be positioned closer to the input conveyor 11 or positioned closer to the output conveyors 17,19; it may extend the entire length L of the top plate 33; or it may be in any other configuration that meets the needs of the particular diverting apparatus 23 and the overall needs of the conveyance system.

Additionally, the secondary air passageways 51 in the first diversion zone Z1 are shown as configured in parallel columns. The secondary air passageways 51 may also, or may alternatively, be any other pattern or random placement throughout the first diversion zone D1. The pattern of the secondary air passageways 51 in the first diversion zone D1 may be different along the length L of the top plate 33, along the width W of the top plate 33, or both.

The secondary air passageways 51 that make up the first diversion zone D1 are pointed in the direction that it is desired to divert the articles 12. This may be, as shown in FIG. 3, perpendicular to the conveyance direction X. The secondary air passageways 51 may alternatively be at angle between parallel to perpendicular to the conveyance direction X. Additionally, as shown in FIG. 3 the columns of secondary air passageways 51 of the first diversion zone D1 may be tapered in the conveyance direction X. This type of configuration may help minimize the use of air to the upper surface 37 in areas that the articles 12 will not travel along the diverting apparatus 23.

In the embodiment shown in FIG. 6, the diverting apparatus 23 has a second diversion zone D2 that utilizes diverting primary air passageways 61 to help divert articles 12 from one conveyance zone to another conveyance zone. By using diverting primary air passageways 61 rather than intermittent air as used in the secondary air passageways 51, the air is always flowing at the upper surface 37 as long as air is supplied to the air chamber 31. These diverting primary air passageways 61 are able to provide aid to the intermittent air blasts of the first diversion zone D1 to divert the articles 12. As with the first diversion zone D1, the diverting primary air passageways 61 of the second diversion zone D2 may be arranged in parallel columns (as shown in FIG. 6) or any pattern or design that will aid the first diversion zone D1. The first and second diversion zones D1, D2 may overlap; they may be sequential and adjacent along the conveyance direction X; they may be separated along the length L; or any combination thereof. As the case with the first diversion zone D1, the pattern of the diverting primary air passageways 61 may be tapered as shown in FIG. 6 to minimize the number of air passageways in areas that articles 12 will not travel. Additionally, it may be desired that the second diversion zone only minimally, if at all, overlap the first conveyance zone Z1 to minimize the unintended diversion of articles 12 from the first conveyance zone Z1 to the second conveyance zone Z2.

Figure 7:
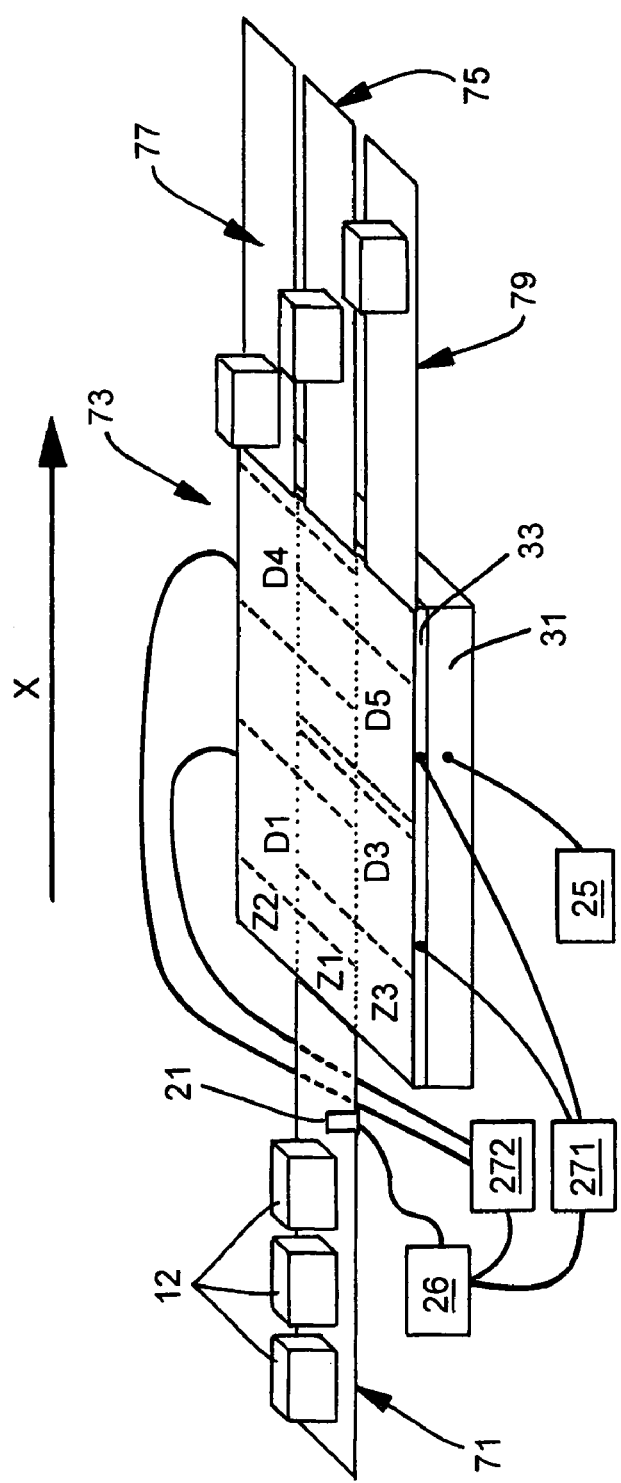
FIG. 7 is a schematic, perspective view of an article conveyance system including an embodiment of the diverting apparatus of the present invention.

In the embodiments shown in FIGS. 2, 3 and 6, the diverting apparatus 23 is shown with two conveyance zones and one or two diversion zones that operate to divert an article 12 in a single direction. However, as shown in FIG. 7, the diverting apparatus 73 may have more than two conveyance zones. The embodiment of FIG. 7 adds a third conveyance zone Z3 to the diverting apparatus 73. Additional conveyance zones could be added to accommodate the needs of the overall conveyance system.

In the embodiment of FIG. 7, articles 12 approach the diverting apparatus 73 via the input conveyor 71 and enters the first conveyance zone Z1 of the diverting apparatus 73. As is desired, the article 12 may be diverted from the first conveyance zone Z1 to the second conveyance zone Z2 by an intermittent air blast in the first diversion zone D1. Alternatively, the article 12 may be diverted from the first conveyance zone Z1 to the third conveyance zone Z3 in the third diversion zone D3. The articles 12 are then conveyed through one of the first, second or third conveyance zones Z1, Z2, Z3 to the respective first, second or third output conveyors 75, 77, 79.

Functionality may also be added to the diverting apparatus 73 by supplying additional diversion zones that could divert articles 12 from the second and third conveyance zones Z2, Z3 back to the first conveyance zone Z1. As shown in FIG. 7, the fourth diversion zone D4 could divert articles 12 from the second conveyance zone Z2 to the first conveyance zone Z1; the fifth diversion zone D5 could divert articles 12 from the third conveyance zone Z3 to the first conveyance zone Z1. This type of functionality allows for the ability to move the articles 12 freely between multiple conveyance zones. This becomes more important with longer diverting apparatuses 73 with multiple conveyance zones. Such flexibility allows for efficient and continuous operation of the diverting apparatus 73.

The air delivered to the upper surface 37 by the third, fourth and fifth diversion zones D3, D4, D5 may be provided in the same matter as described earlier for the first diversion zone D1. Intermittent air supplied by secondary air passageways 51 exits to the upper surface 37 pointed in the general direction it is desired to divert the articles 12. The intermittent air supplied to each of the diversion zones may be the same systems, multiple identical systems, or may be a combination of systems. Each of the diversion zones may be designed with air pressure and hole patterns that are similar or may be individually unique; the diversion zone needs to be whatever is necessary for the particular articles and overall conveyance system requirements.

The embodiment of FIG. 7 illustrates the articles 12 being delivered by the input conveyor 71 to the center of three conveyance zones and subsequent diversion of the articles 12 to either of two conveyance zones that are adjacent and lie on the outer edges of the diverting apparatus 73. Alternatively, the system may be designed to deliver articles 12 to either of the conveyance zones on the outer edges of the diverting apparatus 73 and subsequently diverted to the other conveyance zones.

Additionally, the diverting apparatus 73 could accommodate multiple input streams (not shown) of the incoming articles 12 to multiple conveyance zones and allow for diversion among such conveyance zones to a myriad of output conveyors. The diverting apparatus 73 may have a myriad of primary air passageways 41 and secondary air passageways 51 that could be configured and controlled to enable the support, conveyance and diversion of an article 12 through any path across the diverting apparatus and deliver the article 12 to any output stream that is desired.

Figure 8:
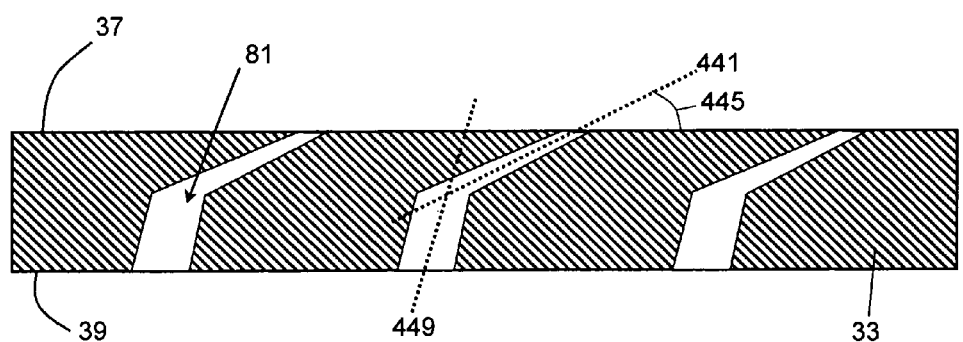
FIG. 8 is a cross-sectional view, of the top plate of the diverting apparatus of the present invention, as viewed from the side.

Further embodiments of the top plate 33 design are available by modifying the air passageways. With standard fabrication using drill bits, the holes are generally uniform cylindrical shapes. Other fabrication techniques may be used to produce other types of passageway designs that may have additional benefits. One possible design is shown in FIG. 8 where the primary air passageways 41 are non-linear in shape. As seen in FIG. 8, the primary air passageways 41 have a bent shape giving the passageways two distinct axes 441, 449. Additionally, a primary air passageway 41 may be non-uniform by having a larger area near the bottom surface 39 than near where it exits the upper surface 37 (as shown in FIG. 8). By using such a design, the primary air passageway 41 could act as a nozzle and could provide air at a higher velocity at the upper surface 37 with a lower supplied pressure to the air chamber 31. For instance, rather than using facility air pressure, one could use a commercially available fan on the air chamber 31 that could produce a minimal air pressure in the air chamber 31 while providing the upper surface 37 with air pressure similar to that provided by the previously discussed primary air passageway 41 designs.

It may also be advantageous to provide a primary exit angle 445 shallower than feasible with common fabrication methods. A shallower angle to the upper surface 37 may be advantageous to the primary air passageways 41 or secondary air passageways 51 or both. The shallower angle would provide much more impetus to the article 12 in the direction it is pointed. Such a shallower primary or secondary exit angle 445,555 may be an angle approximately forty-five degrees or less to the upper surface 37. Preferably the primary or secondary exit angle 445, 555 may be an angle approximately thirty degrees or less to the upper surface 37.

Such a design of non-linear and non-uniform air passageways may be achieved with rapid prototyping techniques as commonly known in the art such as Fused Deposition Modeling (FDM), Stereolithography (SL) and Selective Laser Sintering (SLS). In each case, more complex designs may be produced than can be achieved through common machining techniques. For example, with FDM, three-dimensional parts are produced from CAD-generated models by extruding material in a layer-by-layer method to build up the finished part. Typically such rapid prototyping techniques may produce a top plate 33 made of metal, ABS or polycarbonate with a complex design of passageways.

While the non-linear and non-uniform design as shown for primary air passageways 41 in FIG. 8, the same type of design could also be used to produce secondary air passageways 51 and air shafts 53. Other designs could be used; the air passageways could be of any shape, including, but not limited to curved, spiral, steps, or multiple bends. The exits of the air passageways could also designed as individual nozzle orifices. Additionally, the air shafts 53 could also be non-linear and could be designed to be interconnected to distribute air internally throughout the top plate 33.

EXAMPLE

One exemplary diverting apparatus has been used to convey bundles of folded paper towels from a production machine to two packaging streams. The bundles consisted of stacks of folded paper towels that were held together by a paper wrapper about the stack. Bundles were delivered to the diverting apparatus by an input conveyor and were detected by a MINI-BEAM® SM2A312 Series Photoelectric Sensor, available from Banner Engineering Corp., Minneapolis, Minn. The sensor sent signals to a Rockwell Automation Logix5555 Processor (Model 1756-L55 with 1756-m13 memory expansion sub-module), available from Rockwell Automation, Milwaukee, Wis., which decided whether or not to divert the bundle to the second packaging stream. Generally, every other bundle was diverted to the second packaging stream rather than continuing to the first packaging stream. For the bundles that were diverted, a signal was sent to a pair of ASCO® TopHat® Long Life solenoid valves (Model 8210G2Q), available from ASCO, Florham Park, N.J., which delivered intermittent air to the diverting apparatus.

Figure 9:
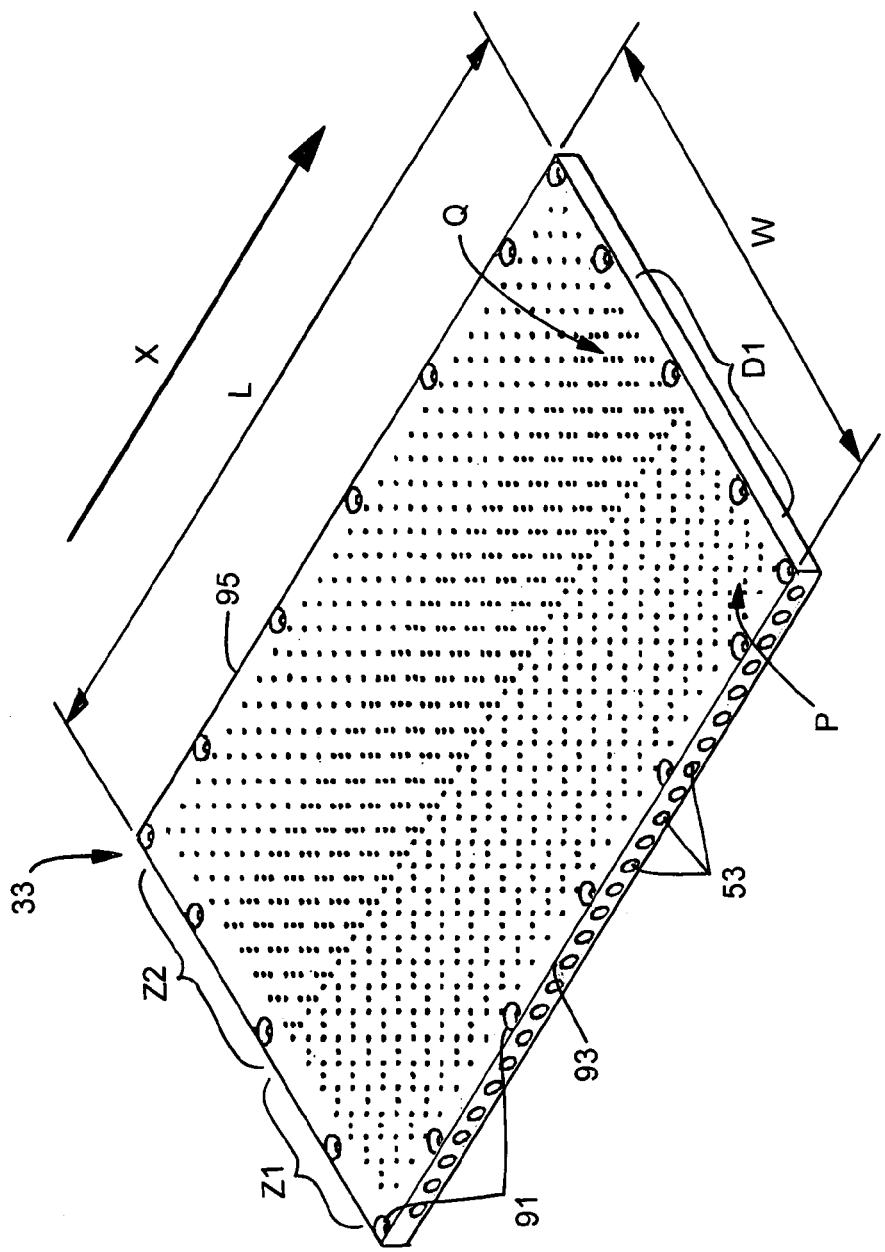
FIG. 9 is a perspective view of an embodiment of the top plate of the diverting apparatus of the present invention.

The diverting apparatus itself had an air chamber that was rectangular in shape and was made from 0.25-inch (6.4 mm) thick aluminum plate. The air chamber was approximately 4 inches (102 mm) tall, 12.5 inches (318 mm) wide, and 20.5 inches (521 mm) long. The top plate 33 of the diverting apparatus was made from ⅝-inch (15.9 mm) aluminum plate and was approximately 12.5 inches (318 mm) wide, 20.5 inches (521 mm) long. FIG. 9 illustrates the exemplary top plate 33. The top plate 33 was attached to the air chamber by bolts 91 around the peripheral edges of the top plate 33, flush to the upper surface of the top plate 33. To ensure an airtight seal, silicone sealant was used on the surfaces where the air chamber contacted the top plate 33.

The top plate 33 was divided into two conveyance zones. The first conveyance zone Z1 extended across the width W of the top plate 33 from about 0.375 inches (9.6 mm) from the first edge 93 of the top plate 33 to about 5.4 inches (137 mm) from the first edge 93. The second conveyance zone Z2 extended across the width W of the top plate 33 from where the first conveyance zone Z1 ended to about 0.375 inches (9.6 mm) from the opposite edge 95 of the top plate 33. The diversion zone D1 of the top plate 33 extended along the length L of the top plate 33, less about 0.375 inches (9.6 mm) on each edge, and extended across the width W of the top plate 33 from about 1-inch (25 mm) from the first edge 93, across the first conveyance zone Z1, to a point approximately 8 inches (203 mm) from the first edge 93.

The air shafts 53 and air passageways were produced by machining the aluminum top plate 33 from a CAD-model. The primary air passageways that made up the first and second conveyance zones Z1, Z2 extended from the air chamber, through the top plate 33, to the upper surface of the top plate 33. The primary air passageways had a 1/16-inch (1.59 mm) diameter and intersected the upper surface at a 45-degree angle to the surface.

The first conveyance zone Z1 was the default conveyance zone for the diverting apparatus. The bundles entered the diverting apparatus in the first conveyance zone Z1 and continued through the zone to the first output conveyor, unless the bundle was diverted to the second conveyance zone Z2.

Figure 10A:
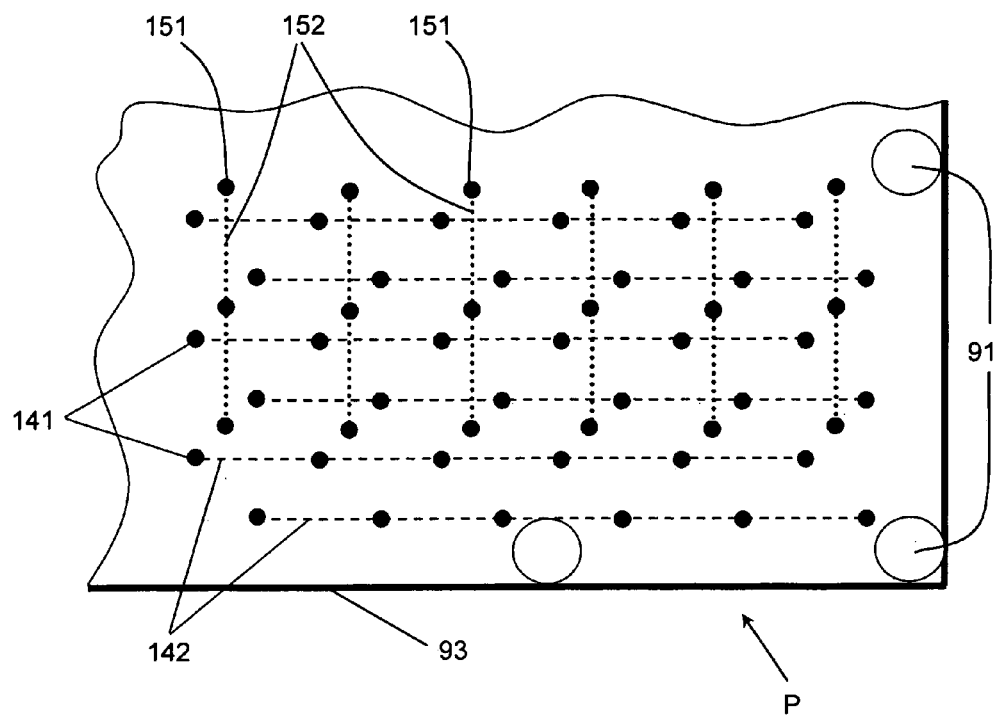
FIG. 10A is a plan view of an enlarged portion of the top plate of FIG. 9 (not to scale).

FIG. 10A is an enlarged view of the portion of the top plate 33 marked as P on FIG. 9. Although the portion P shown in FIG. 10A is not to scale it is included to better illustrate the configuration of the primary air passageways 141 and secondary air passageways 151 within the first conveyance zone Z1. The primary air passageways 141 of the first conveyance zone Z1 were arranged in parallel rows 142 that were parallel to the length L of the top plate 33. For clarity, dashed lines are used in FIG. 10A to illustrate the parallel rows 142 of primary air passageways 141 and the alignment of the individual primary passageways 141 within the parallel row 142. The parallel rows 142 of primary air passageways 141 were spaced approximately 0.375 inches (9.6 mm) apart. The individual primary air passageways 141 within each parallel row 142 were spaced approximately 0.75 inches (19.1 mm) apart. Each successive parallel row 142 across the width of first conveyance zone Z1 was staggered lengthwise such that individual air passageways 141 were aligned with those in every other alternating parallel row 142, rather than aligned with those individual air passageways 141 in adjacent, parallel rows 142.

Figure 10B:
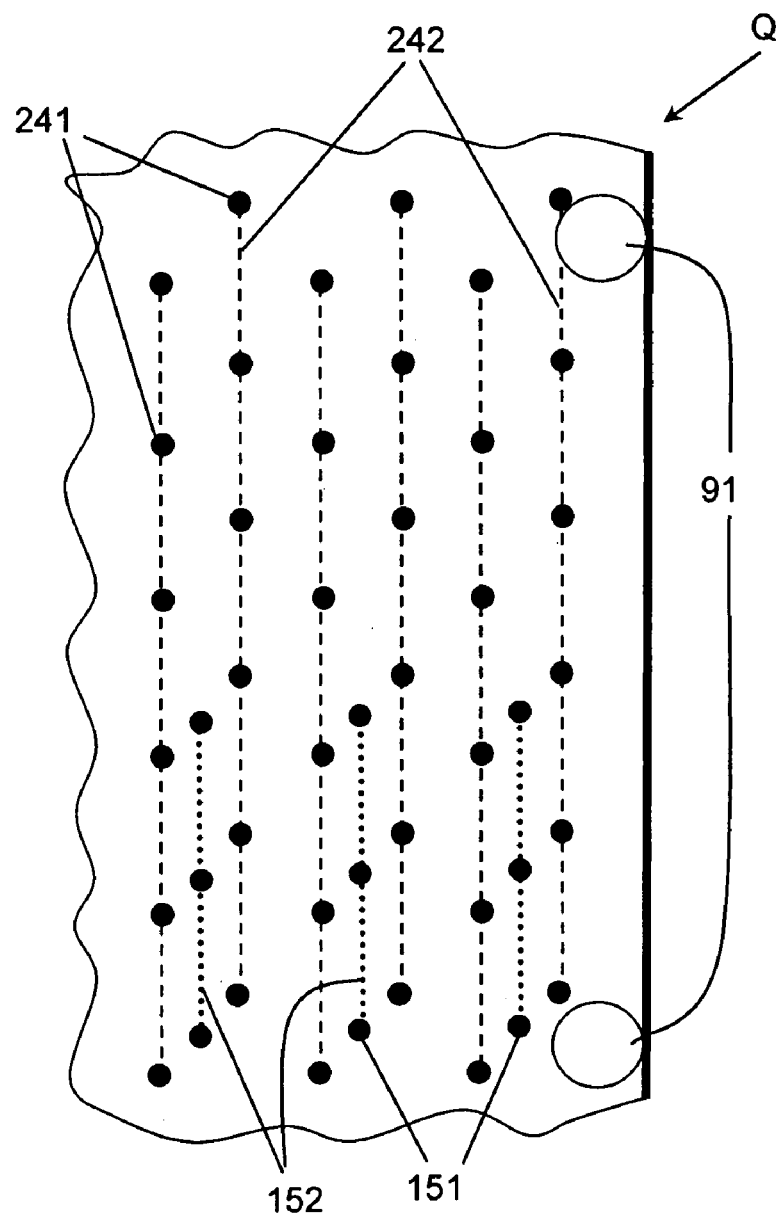
FIG. 10B is a plan view of an enlarged portion of the top plate of FIG. 9 (not to scale).

FIG. 10B is an enlarged view of the portion of the top plate 33 marked as Q on FIG. 9. Although the portion Q shown in FIG. 10B is not to scale it is included to better illustrate the configuration of the primary air passageways 241 and secondary air passageways 151 within the second conveyance zone Z2. The second conveyance zone Z2 helped divert bundles to second output conveyor. The primary air passageways 241 of the second conveyance zone Z2 had the same dimensions, spacing, and staggered configuration as found in the first conveyance zone Z1. However, the primary air passageways were arranged in parallel columns 242 which were parallel to the width W of the top plate 33 (i.e., perpendicular to the parallel rows 142 of the first conveyance zone Z1). For clarity, dashed lines are used in FIG. 10B to illustrate the parallel columns 242 of primary air passageways 241 and the alignment of the individual primary air passageways 241 within the parallel column 242.

The diversion zone D1 provided intermittent air to the upper surface of diverting apparatus to divert bundles, as desired, to the second output conveyor. The air shafts 53 of the diversion zone D1 were bored from the first edge 93 of the top plate 33 to approximately 8 inches (203 mm) into the top plate 33, parallel to the top surface and the width W of the top plate 22. The diameter of each air shaft 53 was 1/8-inch (3.2 mm) and they were countersunk and threaded at the first edge (1/8-inch NPT) to allow connection of the intermittent air supply. The individual air shafts 53 were parallel to each other and were spaced approximately 0.75 inches (19.1 mm) apart along the length L of the top plate 33.

The secondary air passageways 151 extended from the air shafts 53 to the upper surface of the top plate 33. They had a 1/16-inch (1.59 mm) diameter and intersected the upper surface at a 45-degree angle to the surface, and were all pointed in the direction parallel with the width W of the top plate 33. The individual secondary air passageways 151 were arranged in parallel columns 152 spaced approximately 0.75 inches (19.1 mm) apart. For clarity, dotted lines are used in FIGS. 10A and 10B to illustrate the parallel columns 152 of secondary air passageways 151 and the alignment of the individual secondary passageways 151 within the parallel column 152. The parallel columns 152 of the secondary air passageways 151 were arranged to fit between the parallel rows 142 of primary air passageways 141 within the first conveyance zone Z1 (see FIG. 10A) and between the parallel columns 242 of primary air passageways 242 within the second conveyance zone Z2 (see FIG. 10B).

Regulated air was provided to the air chamber at a pressure of 15 psi. An ASCO® TopHat® General Service solenoid valves (Model EF 8210G3), available from ASCO, Florham Park, N.J., allowed the air to the air chamber to be shut off when the machine was shut down, rather than continually venting air through the primary air passageways when it was not needed. The intermittent air was regulated to 75 psi and was delivered through the pair of solenoid valves discussed above. One solenoid valve was connected to the air shafts 53 located on the first half of the diversion zone D1, closest to the input conveyor, while the second solenoid valve was connected to the air shafts 53 located in the second half of the diversion zone D1, closest to the output conveyors. The processor was programmed to send consecutive signals to the first solenoid and then to the second solenoid. Thus a bundle that was to be diverted was hit first by diversion air provided through the first solenoid valve, continued along the diversion apparatus, and was then hit by a second diversion air blast provided through the second solenoid valve.

A slide plate was used in combination with the diverting apparatus to ensure that the bundles reached the first or second output conveyors. The slide plate was made from 1/16-inch (1.59 mm) polished aluminum plate. The plate was bent along the length of its centerline and measured approximately 12 inches (305 mm) long and 12 inches (305 mm) wide.

Bundles of approximately 175 individual folded paper towels that weighed approximately 0.875 pounds (397 g) were conveyed using this exemplary diverting apparatus. The bundles were approximately 5.1 inches (130 mm) tall, 3.5 inches (89 mm) wide and 9.4 inches (239 mm) long. The diverting apparatus, using the air pressures as discussed, was capable of conveying and diverting such bundles across its top surface at an air-supported height above the upper surface of the top plate of approximately 1/8-inch (3.2 mm) to 1/4-inch (6.4 mm).

We claim:

1. An apparatus for conveying articles from one or more input streams to at least two output streams, the apparatus comprising:
   an air chamber connected to a primary air source;
   a top plate attached to the top of the air chamber; and
   an intermittent air supply connected to the top plate,
   where the top plate comprises an upper surface having a
      first conveyance zone, a second conveyance zone adjacent to the first conveyance zone, and a first diversion zone over which articles are selectively propelled from the first conveyance zone to the second conveyance zone;

where the first conveyance zone comprises a plurality of primary air passageways arranged such that the articles are supported and propelled through the first conveyance zone in a conveyance direction by air from the air chamber passing through such primary air passageways, where second conveyance zone comprises a plurality of primary air passageways arranged such that the articles are supported and propelled through the second conveyance zone in the conveyance direction by air passing from the air chamber through such primary air passageways, and where the first diversion zone comprises a plurality of secondary air passageways arranged to selectively divert articles from the first conveyance zone to the second conveyance zone by air supplied by the intermittent air supply to the upper surface through such secondary air passageways.

2. The apparatus of claim 1, where the top plate further comprises a bottom surface, and where the plurality of primary air passageways extend from the bottom surface to the upper surface and intersect the upper surface at an angle to the upper surface of ninety degrees or less.

3. The apparatus of claim 1, where the top plate further comprises a bottom surface; edge surfaces that extend from the upper surface to the bottom surface and form the periphery of the top plate; and a plurality of air shafts that extend from the edge surfaces into the top plate, and where the plurality of secondary air passageways extend from the air shafts to the upper surface and intersect the upper surface at an angle to the upper surface of ninety degrees or less.

4. The apparatus of claim 2, where the primary air passageways intersect the upper surface of the top plate at an angle to the upper surface between about fifteen degrees and about seventy-five degrees.

5. The apparatus of claim 4, where the primary air passageways intersect the upper surface of the top plate at an angle to the upper surface between about thirty degrees and about sixty degrees.

6. The apparatus of claim 2, where the primary air passageways intersect the upper surface of the top plate at an angle to the upper surface of about forty-five degrees or less.

7. The apparatus of claim 6, where the primary air passageways intersect the upper surface of the top plate at an angle to the upper surface of about thirty degrees or less.

8. The apparatus of claim 2, where the primary air passageways are non-linear in shape.

9. The apparatus of claim 2, where the primary air passageways have a smaller area near the upper surface of the top plate than near the bottom surface of the top plate.

10. The apparatus of claim 2, where the primary air passageways have a nozzle near the upper surface.

11. The apparatus of claim 3, where the secondary air passageways intersect the upper surface of the top plate at an angle to the upper surface of about seventy-five degrees or less.

12. The apparatus of claim 11, where the secondary air passageways intersect the upper surface of the top plate at an angle to the upper surface of about sixty degrees or less.

13. The apparatus of claim 3, where the secondary air passageways intersect the upper surface of the top plate at an angle to the upper surface of about forty-five degrees or less.

14. The apparatus of claim 13, where the secondary air passageways intersect the upper surface of the top plate at an angle to the upper surface of about thirty degrees or less.

15. The apparatus of claim 3, where the secondary air passageways are non-linear in shape.

16. The apparatus of claim 3, where the secondary air passageways have a nozzle near the upper surface.

17. The apparatus of claim 3, where the secondary air passageways have a smaller area near the upper surface of the top plate than near the bottom surface of the top plate.

18. The apparatus of claim 1, further comprising a sensor that detects articles entering the input side of the apparatus and a processor linked to the sensor that determines whether the article is to be diverted to the second conveyance zone and sends the appropriate signal to the intermittent air supply.

19. The apparatus of claim 1, where the intermittent air supply comprises a secondary air supply intermittently controlled by one or more solenoid valves.

20. The apparatus of claim 19, where the secondary air supply is split between a first bank of solenoid valves and a second bank of solenoid valves, where the first bank of solenoid valves control the supply of air to a plurality of secondary air passageways present in the first diversion zone closer to the input side of the apparatus, and where the second bank of solenoid valves control the supply of air to a plurality of secondary air passageways present in the first diversion zone closer to the output side of the apparatus, such that when an article is to be diverted to the second conveyance zone from the first conveyance zone, the article is sequentially first impacted by air controlled by the first bank of solenoid valves and then is subsequently impacted by air controlled by the second bank of solenoid valves as the article travels in the conveyance direction and is simultaneously diverted from the first conveyance zone to the second conveyance zone.

21. The apparatus of claim 1, further comprising a second diversion zone comprising a plurality of primary air passageways arranged to both support the articles and to aid the first diversion zone in diverting the article from the first conveyance zone to the second conveyance zone using air supplied by such primary air passageways.

22. The apparatus of claim 1, further comprising a third conveyance zone and a third diversion zone, where the third conveyance zone is adjacent to the first conveyance zone and comprises a plurality of primary air passageways arranged such that articles are supported and propelled through the third conveyance zone in the conveyance direction by air supplied to the upper surface through the primary air passageways, and where the third diversion zone comprises a plurality of secondary air passageways arranged to selectively divert an article from the first conveyance zone to the third conveyance zone with air from an intermittent air supply that is supplied to the upper surface through the secondary air passageways.

23. The apparatus of claim 22, further comprising a fourth diversion zone and a fifth diversion zone, where the fourth diversion zone comprises a plurality of secondary air passageways arranged to selectively divert an article from the second conveyance zone to the first conveyance zone with air from an intermittent air supply that is supplied to the upper surface through the secondary air passageways, and where the fifth diversion zone comprises a plurality of secondary air passageways arranged to selectively divert an article from the third conveyance zone to the first conveyance zone with air from an intermittent air supply that is supplied to the upper surface through the secondary air passageways.

* * * * *